(12) United States Patent
Horne (10) Patent No.: US 10,701,923 B2
(45) Date of Patent: Jul. 7, 2020

(54) PORTABLE LIGHT AND INSECT EXTERMINATION DEVICE

(71) Applicant: Alliance Sports Group, L.P., Fort Worth, TX (US)

(72) Inventor: Gregory Lee Horne, Euless, TX (US)

(73) Assignee: Alliance Sports Group, L.P., Grand Prairie, TX (US)

( * ) Notice: Subject to any disclaimer, the term of this patent is extended or adjusted under 35 U.S.C. 154(b) by 0 days.

(21) Appl. No.: 16/448,945

(22) Filed: Jun. 21, 2019

(65) Prior Publication Data

US 2019/0307113 A1 Oct. 10, 2019

Related U.S. Application Data

(63) Continuation-in-part of application No. 16/258,880, filed on Jan. 28, 2019, which is a continuation of application No. 15/995,426, filed on Jun. 1, 2018, now Pat. No. 10,188,091, application No. 16/448,945, which is a continuation-in-part of application No. 15/916,433, filed on Mar. 9, 2018, now Pat. No. 10,260,688.

(60) Provisional application No. 62/513,542, filed on Jun. 1, 2017.

(51) Int. Cl.
  *A01M 1/04* (2006.01)
  *A01M 1/22* (2006.01)

(52) U.S. Cl.
  CPC .............. *A01M 1/04* (2013.01); *A01M 1/223* (2013.01)

(58) Field of Classification Search
  CPC .................. A01M 1/04; A01M 1/223
  See application file for complete search history.

(56) References Cited

U.S. PATENT DOCUMENTS

| 5,469,346 A | 11/1995 | Haut et al. |
| 6,055,766 A | 5/2000 | Nolen et al. |
| 6,134,826 A | 10/2000 | Mah |
| 7,360,921 B1 | 4/2008 | Greenspon |
| 2006/0262526 A1 | 11/2006 | Dubois |

(Continued)

FOREIGN PATENT DOCUMENTS

| CN | 204014833 U | 12/2014 |
| EP | 2158141 B1 | 5/2013 |

(Continued)

OTHER PUBLICATIONS

International Search Report dated Jul. 12, 2018, in PCT Application No. PCT/US2018/021734, filed Mar. 9, 2018; 3 pages.

(Continued)

*Primary Examiner* — Thomas M Sember
(74) *Attorney, Agent, or Firm* — Thorpe North & Western LLP (57) ABSTRACT

A combination lighting apparatus and insect extermination device is disclosed having a housing with an upper section and a lower section separated by a first aperture. A light source is disposed in the upper section. An electrical grid and negative pressure source are disposed in the lower section. A power source is coupled to the light source, the electric grid, and the pressure source. A second aperture is located in the lower section after the electric grid, wherein air is propagated inward through the first aperture, through the electrical grid and out the second aperture.

14 Claims, 11 Drawing Sheets

(56) References Cited

U.S. PATENT DOCUMENTS

2008/0034642 A1    2/2008  Chen
2017/0002994 A1    1/2017  Fisher et al.
2017/0094960 A1*   4/2017  Sasaki .................... H02S 40/32

FOREIGN PATENT DOCUMENTS

| GB | 2540530 A | 1/2017 |
| KR | 20-2013-0006888 U | 12/2013 |
| KR | 10-1545083 B1 | 8/2015 |
| KR | 10-1711395 B1 | 3/2017 |

OTHER PUBLICATIONS

International Search Report dated Sep. 24, 2018, in International Application No. PCT/US18/35599, filed Jun. 1, 2018; 16 pages.

* cited by examiner

PORTABLE LIGHT AND INSECT EXTERMINATION DEVICE

PRIORITY

This application is a continuation in part of and claims priority to U.S. application Ser. No. 16/258,880 filed on Jan. 28, 2019 entitled "Portable Light and Insect Extermination Device" which is incorporated herein by reference. This application also claims priority to U.S. Provisional Patent Application Ser. No. 62/513,542 filed on Jun. 1, 2017 and U.S. Non-Provisional patent application Ser. No. 15/995,426 filed Jun. 1, 2018, both entitled "Portable Light and Insect Extermination Device" which are both incorporated herein by reference in its entirety. This application also claims priority to U.S. application Ser. No. 15/916,433 entitled "Method and Apparatus for Controlling Lighting Modules of a Multi-Element Portable Light" filed on Mar. 9, 2018 which is incorporated herein by reference in its entirety

FIELD

The present technology relates to lighting devices. Specifically, multiple use lighting devices and methods of operation.

BACKGROUND

UV lighting devices used to attract insects for extermination have been previously produced. A limitation with prior art extermination devices is that the UV light and extermination grid are always exposed which can be unsightly and unsanitary if the device is being transported near food. Also, in some devices, the light may be too bright for indoor use and/or too bright for continued use and/or is limited in its versatility to the end user.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

The term "flashlight" as used herein is used as an example of a lighting device that may employ the technology herein but should not be construed as limiting what kinds of lighting devices may employ the current technology. As such, the term flashlight should be broadly construed to include lanterns, headlamps, and other various portable lighting devices.

An initial overview of the technology is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the current technology improves electrical discharge insect control systems (also called "bug zappers") that attract and kills flying insects that are attracted by light. A light source attracts insects to an electrical grid, where they are electrocuted by touching two wires with a high voltage between them. In one aspect, the electrical grid is housed in a protective cage or shroud of plastic, grounded metal bars, or some other material, to prevent people or animals from touching the high voltage grid. In another aspect, the electric grid is located within a housing that is not susceptible to contact and thus does not require a protective cage. In one aspect, a first light source is located inside the protective shroud and is designed to emit both visible and ultraviolet light. In one aspect, the distance between adjacent wires ranges from 2 mm to 5 mm. A high-voltage power supply powered by mains electricity, which may be a simple transformerless voltage multiplier circuit made with diodes and capacitors, generates a voltage high enough to conduct through the body of an insect which bridges the two grids, but not high enough to spark across the air gap. Enough electric current flows through the small body of the insect to heat it to a high temperature and exterminate it. In one aspect, the voltage level ranges from about 500 to 600 volts.

In one aspect of the technology, the electrical grid and the first light source are placed in an extendable portion of a collapsible device. A back end of the device comprises a cavity for housing a power source and electrical circuitry. A front end of the device comprises a forward directed light. Advantageously, when the device is in an "open" configuration an electrical grid and grid light source are exposed and can function as lateral lighting and/or an insect extermination device. When the device is in a "closed" configuration, the insect extermination and lateral lighting components are enclosed within the device after being slidably disposed therein. However, the front end light is operable as a conventional flashlight device or may include a diffuser to create an area light. The lighting and electrical grid operational options are all operable from a single control switch.

With reference to FIGS. 1 through 7, one example of an insect extermination/lighting device that may employ the current technology is disclosed. The device is generally shown at 30 in FIGS. 1 through 7. In FIGS. 1 through 6, the device 30 is shown in an open position. A first housing or shroud 10 comprises an open end in communication with a cavity. The cavity is configured to house and enclose an electrical grid (6, 7) therein when the device is in a "closed" position (see, e.g., FIG. 7). Meaning, in a closed (or retracted) position the electrical grid (6, 7) is enclosed in the cavity within housing 10 and in an open (or extended) position, the electrical grid (6, 7) is exposed to the ambient environment.

In one aspect of the technology, the first housing or shroud 10 is coupled to a second housing (or lower shroud) 16 which comprises, for example, a forward directed light assembly or second light source. In one aspect of the technology, the forward directed light assembly comprises an LED 17 (or other light source) coupled to a control switch 14. The LED 17 is housed within a reflector 18 that is secured within the second housing 16 with capture ring 19. A lens 20 is disposed about the distal end of the reflector 18 and is also secured by the capture ring 19. In one aspect of the technology, the capture ring 19 comprises a plurality of magnets configured to allow the user to couple the device 30 to a ferrous surface. For purposes of describing the figures, housing 10 and a housing 16 are described. However, it is understood that the forward directed light assembly (or second light source) can be located in the same housing as the cavity that houses the electrical grid (6,7) when the device is in a closed configuration.

In one aspect of the technology, when the device 30 is in an open position, the device 30 is intended to be placed on a flat surface such that the capture ring 19 and/or lens 20 are adjacent the flat surface. The flat surface may be a table top or ceiling (i.e., a horizontal surface) or a wall (i.e., a vertical surface) wherein the device 30 is affixed. In an open or extended position, the slidable portion of the device 30 is extended from the cavity within housing 10. In another aspect, however, when the device 30 is in an open configuration, the device 30 is hung by handle 11. In this manner the device 30 may be in an open position wherein the first light (i.e., the UV and/or white light LED combination) is operable and the second light (i.e., the forward-directed white light LED) is operable. In one aspect, the lens 20 comprises a diffuser intended to soften the light emitted from the second light source disposed about a bottom of the device 30. It is important to note that the reference to "forwarded-directed white light LED" is a relative term based on the use of the device. When the device 30 is in a closed configuration, the second light source acts as a general purpose flashlight wherein the user points the device 30 in a direction that he/she wishes to illuminate. Thus, the second light source is "forward-directed." However, in another aspect, when the device is hung, the second light source may be "downward directed."

In one aspect of the technology, a top portion of the device 30 comprises an upper shroud or upper housing 2 that is fixed to the electrical grid (6, 7). The upper shroud 2 comprises a cavity that houses a light control board 3 and an open space for placement of a power source for powering the device 30. While the cavity within the upper housing 2 is intended to house a portable power source (e.g., conventional or rechargeable batteries), the upper housing 2 is also configured to be coupled to a fixed external power source (e.g., an outlet). In another aspect, the power source located within the upper housing 2 is coupled to an external power port intended to charge an external device such as a mobile phone. In this aspect, the portable power source used to power the device 30 can also be used as a "power bank" for other external devices. While a cavity for the power source and power source are described as being located in the upper shroud 2, it is understood that the power source may also be located in the first housing 10 or second housing 16.

A cap 1 is disposed atop the open space of the upper shroud 2. The upper housing 2 is fixedly attached to an electrical grid/lateral light assembly. The electric grid/lateral light (i.e., the first light source) assembly comprises a lighting control shroud 4 that houses an electrical control assembly for powering the electrical grid and the first light source (i.e., the UV and/or white light LED combination). A bottom portion of the control shroud 4 comprises a plurality of LED lights disposed about the perimeter of the shroud 4. In one aspect, the LED lights comprise a plurality of white LED lights and UV LED lights that are on a separate control switch and may be turned on and off independently of one another. In another aspect, the LED lights comprise a plurality of individual LEDs that are configured to emit both a beam of white light (about 400 nm to about 720 nm) in a first mode and/or a beam of UV light (about 315 nm to about 400 nm) in a second mode. While white and UV light LEDs are specifically referenced with a specified wavelength, it is understood that LEDs having numerous other wavelengths (or subsets of the stated UV and white wavelengths) of light may be used herein as suits a particular purpose.

In one aspect of the technology, the LED lights are positioned such that a bottom plane of the LED lights is parallel with a bottom plane of the lens 20 and/or the reflector ring 19. In this orientation, the LED lights propagate light downward in a direction that is parallel with a longitudinal direction of the device 30. The LED lights also propagate light laterally in a direction that is not parallel with a longitudinal direction of the device 30 providing area light to users of the device 30 as well as an amount of UV light to attract insects. In one aspect of the technology, the light control board 3 and lighting control shroud 4 are configured such that a bottom portion of the control shroud 4 is adjacent a top portion of housing 10 when the device 30 is in a closed configuration. However, in an additional aspect of the technology, the light control board 3 and/or lighting control shroud 4 are located beneath the electrical grid (6, 7) instead of above it. In this aspect, the light assembly is configured to emit light upward and outward instead of downward and outward. In one aspect, a lighting control shroud 4 is located above and below the electrical grid (6, 7). In another aspect, LED lights are located inside the electrical grid (6, 7) and oriented such that the LEDs emit light generally outward.

In an additional aspect of the technology, the UV LEDs are configured with pulse-width modulation ("PWM") to "dim" the UV LED while still attracting insects that are attracted to certain frequencies of UV radiation. PWM is one way of regulating the brightness of a light. In some aspects, using different degrees of PWM may attract different insects. Thus, in one geography a user may select a first PWM mode and in a different geography a user may select a second PWM mode. In one aspect, light emission from the LED is controlled by pulses wherein the width of these pulses is modulated to control the amount of light perceived by the end user. When the full direct current voltage runs through an LED, the maximum of light is emitted 100% of the time. That is, the LED emits light 100% of the time when in an "on" mode. With PWM, the voltage supplied to the LED can be "on" 50% of the time and "off" 50% of the time so that the LED gives off its maximum amount of light only 50% of the time. This is referred to as a 50% duty cycle. In this scenario, if the on-off cycle is modulated fast enough, human eyes will perceive only half the amount of light coming from the LED. That is, with such an input on the LED, the amount of light given off appears diminished by 50%. While specific reference is made to a 50% duty cycle, the LED duty cycle of the light sources described herein (UV and/or white LED, etc.) may be greater or lesser than 50% as suits a particular purpose. For example, the UV LED may have a duty cycle that ranges from 25% to 40%, 40% to 50%, 50% to 60%, or 60% to 75%.

In one aspect of the technology, the on-off cycle (i.e., the rate at which the LEDs are turned on and off) is greater than about 80 to about 100 MHz. In another aspect, the on-off cycle is greater than about 100 MHz to about 120 MHz. In another aspect of the technology, the on-off cycle ranges from about 10 to about 200 KHz. In another aspect, the on-off cycle ranges from about 1 KHz to about 20 KHz. Advantageously, the device 30 can be operating in a "dimmed" UV mode while either still providing LED white light or with the perception of little to no UV light at all. The device 30 can also be operated in a "dimmed" white light LED mode with little or no UV light being perceived. That is, the duty cycle of the UV LED may be 100% while the duty cycle of the white light LED is less than 100% or vice versa. In addition, both lights may be operated at 100% of the duty cycle or both may be operated at less than 100% of the duty cycle. Reference may be made herein to LED lights that are not pulse width modulated. Most LED lights will not be operated in a static mode, meaning they will not truly be without any pulse width modulation. For purposes of this application, an LED light is effectively static or effectively without pulse width modulation if it is modulated at a frequency less than bout 2 KHz.

The electrical grid/lateral light assembly further comprises a core 22 made of a metal, ceramic, or polymeric material. The core 22 is coupled to a center of the control shroud 4 and extends downward from the control shroud 4. In one aspect of the technology, the core 22 is cylindrical on a top end and expends outward in a circular orientation toward its bottom end to couple with an internal frictional guide 9 within the cavity of bottom shroud 10. A plurality of electrical grids (6,7) are disposed concentrically about the core 22 and are electrically coupled to shroud 4. The inner grid 6 and outer grid 7 are electrically charged and act as the insect-heating component (i.e., the bug zapper) of the device 30. In one aspect, the grids comprise a mesh or crisscrossing pairs of wires forming a parallelogram-shaped mesh opening ranging from about 3 to about 5 mm wide between wires. Other shaped grids (e.g., circular, triangular, or simple linear bars) may be used as suits a particular design. While two grids are shown, a single grid or more than two grids may be used as suits a particular purpose.

An enclosure 5 is disposed about the exterior of shroud 4 and the core 22 enclosing the electrical grid/lateral light assembly. In one aspect, the enclosure 5 comprises a plurality of transparent bars with spaces there between to optimize lateral light transmission from the device 30 while allowing insects smaller than about 10 mm to travel through the enclosure 5 to the inner and outer grids 6, 7 for extermination. In another aspect, the enclosure 5 comprises a plurality of opaque slats ranging from about 3 to 8 mm in width. The slats are oriented longitudinally about the perimeter of the electrical grid (6, 7) and have a longitudinal space between adjacent slats ranging from about 5 mm to about 10 mm in width. In one aspect, the first and second light sources are substantially water-tight and are enclosed by a lens. Meaning, the first and/or second lights sources are not open to ambient environment. However, the electrical grid 6, 7 must be open to the ambient air to serve its purpose of exterminating insects.

In another aspect of the technology, one or more capsules, pads, or other delivery mechanisms containing octanol (or other biting insect attractants) may be coupled to the enclosure 5. In one aspect, the device 30 is packaged with biting insect attractants that may be placed inside the enclosure 5 from time to time as suits a particular user. The enclosure 5 may comprise a variety of different shapes and/or orientations and may be made from a variety of different materials (metal, plastic, etc.).

Figure 1:
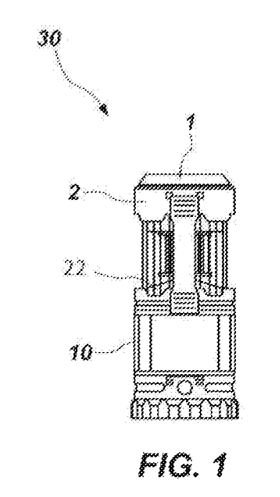
FIG. 1 is a side view of an extendable flashlight/insect extermination device in an "open" configuration in accordance with one aspect of the technology.
Figure 2:
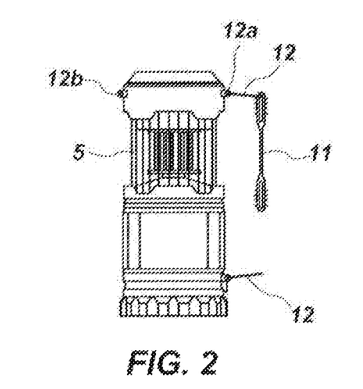
FIG. 2 is an additional side view of the device of FIG. 1.
Figure 3:
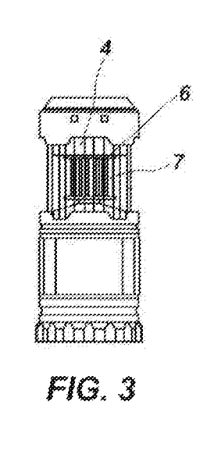
FIG. 3 is an additional side view of the device of FIG. 1.
Figure 4:
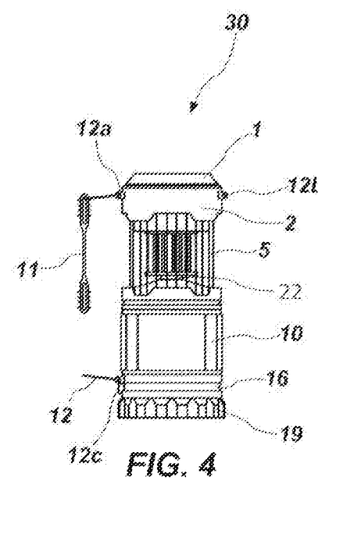
FIG. 4 is an additional side view of the device of FIG. 1.
Figure 5:
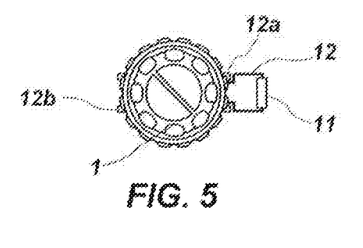
FIG. 5 is a top view of the device of FIG. 1.
Figure 6:
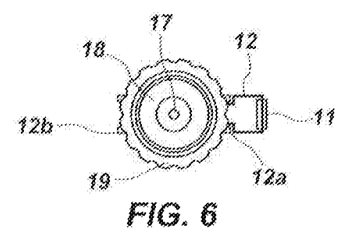
FIG. 6 is a bottom view of the device of FIG. 1.
Figure 7:
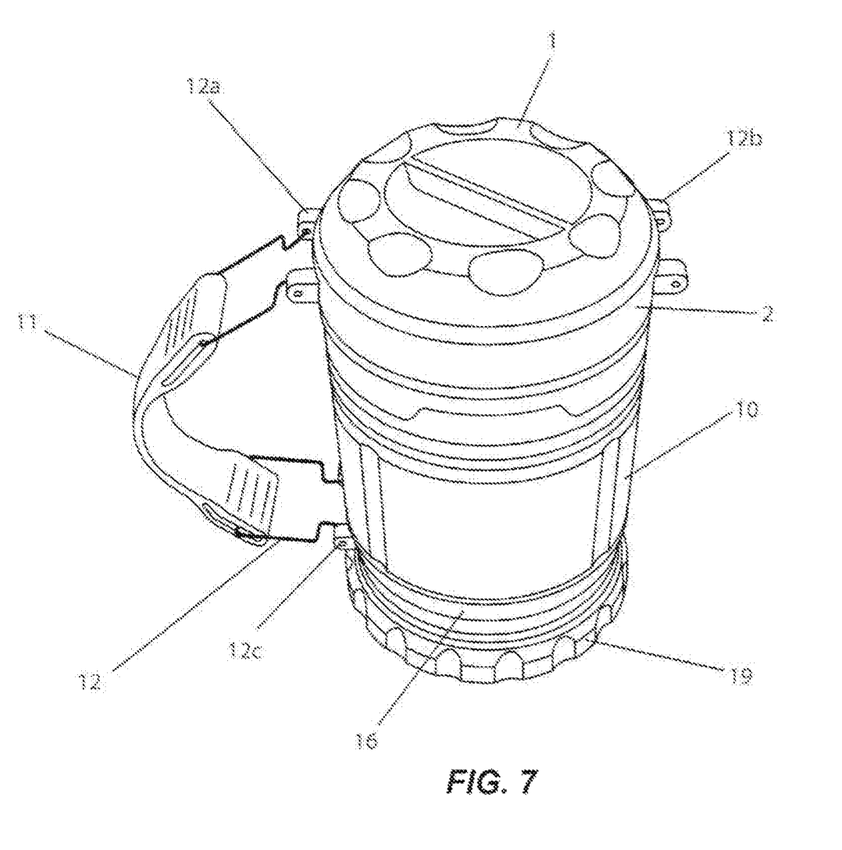
FIG. 7 is a top perspective view of an extendable flashlight/insect extermination device in a "closed" configuration in accordance with one aspect of the technology.
Figure 8:
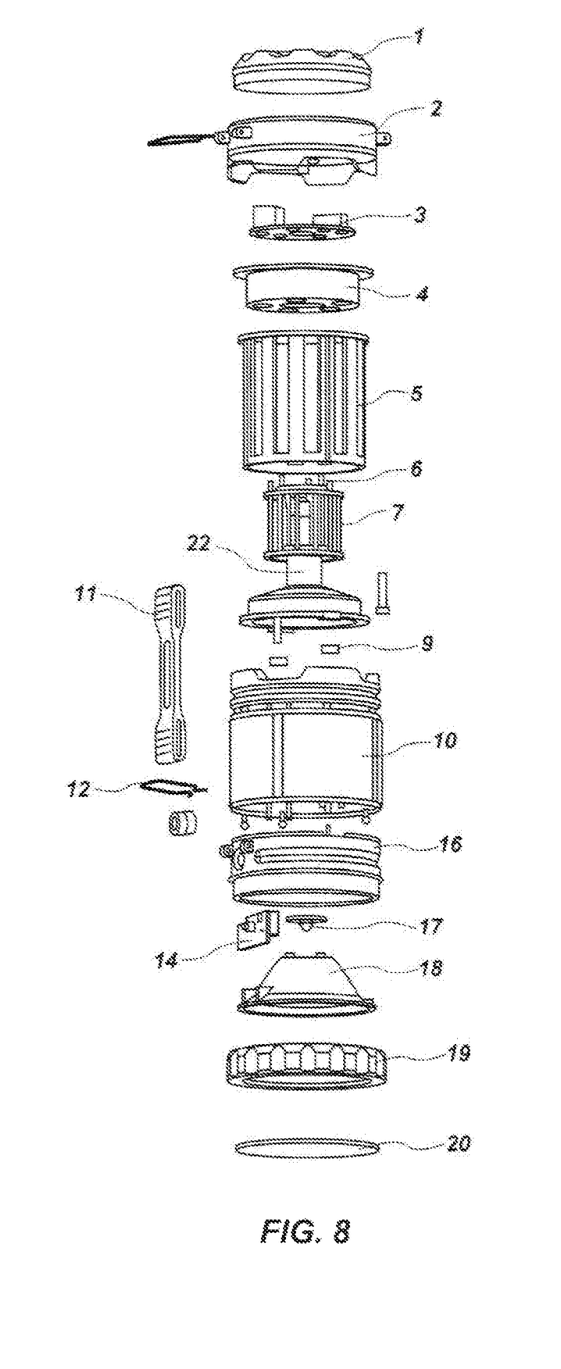
FIG. 8 is an exploded view of an extendable flashlight/insect extermination device in accordance with one aspect of the technology.

FIG. 7 shows the device 30 of FIGS. 1-6 in a closed position. In the closed position, the upper housing 2 is pushed toward the lower housing 10 causing the electrical grid/lateral light assembly to slide into the cavity within lower shroud 10. The device 30 comprises a dual-position handle 11 having a clip 12 on opposite ends of the handle. When the device 30 is in an open position, clips 12 are configured to mate with clip mounts 12a and 12b disposed on opposing sides of the upper housing 2. In this manner, the device 30 may be held from the top of the device. When the device 30 is in a closed position, the clip 12 is disengaged from clip mount 12b and is instead coupled to clip mount 12c. In this manner, the device 30 can be held as a conventional flashlight.

In accordance with one aspect of the technology, the first and second light sources and electrical grids (6, 7) are controlled by switches. For example, one of the switches is a mechanical reveal switch. In a first position the switch indicates to the programmable logic control system that the insect extermination/lighting device is in a closed position, thus indicating that the non-revealed lighting element and electrical grid should not and/or cannot be activated. In a second position, the switch will indicate to the control system that the device is in open (or extended) position, thus indicating that the lighting element(s) and the electrical grid are now revealed and may or may not be activated—depending on the activation of either software or logic controlled switches or the mechanical switch. In one aspect, the UV LED (or UV mode of multi-mode LED) is activated concurrently with activation of the electrical grids 6, 7. The white LED may also be activated while leaving the UV LED and electrical grids on, by cycling through the switch. Generally speaking, when the device is in an open configuration, cycles of the switch comprise a first cycle where the electrical grids/UV LED is activated, a second cycle where the electrical grids/UV LED and white LED are activated, a third cycle where the white LED is activated in high mode and the electrical grids/UV LED are inactive, a fourth cycle where the white LED is activated in a low mode and the electrical grids/UV LED are inactive, and a fifth cycle when the device is in an inactive state. When in a closed configuration, the forward directed LED 17 may be in an inactive state, a lower power mode, or a high power mode.

Figure 9:
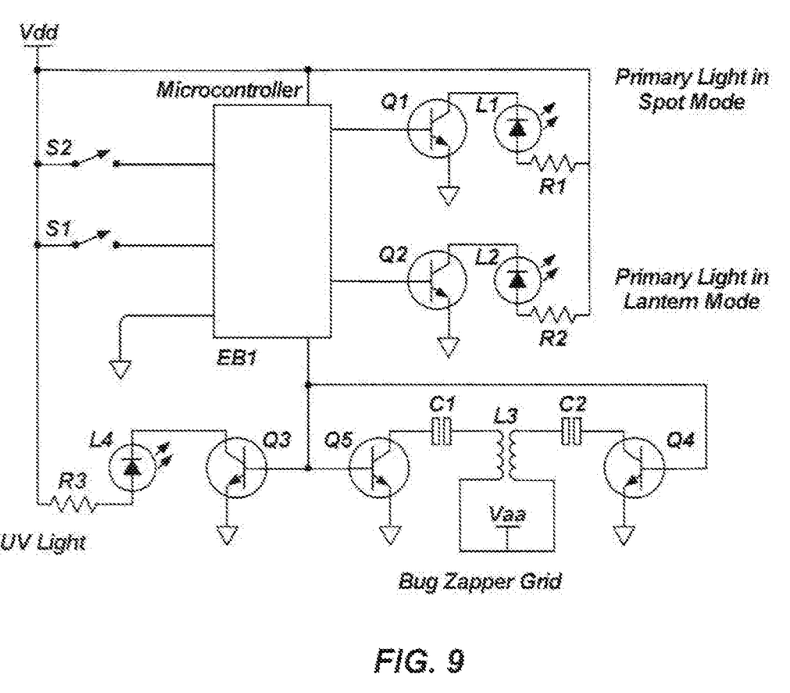
FIG. 9 is an electrical schematic in accordance with one aspect of the technology.

FIG. 9 represents an electrical schematic in accordance with one aspect of the technology. Two mechanical switches S1 and S2 are disclosed, where S2 is dependent on S1 for power. In one aspect, S2 is the reveal mechanical switch. However, even if the housing 2 is extended, (i.e., such that the first light source is exposed), the first light source will not activate unless S1 is active. In one aspect, S1 is a variable voltage switch (e.g., an internal potentiometer) which allows for dimming of either lighting element. A microprocessor may be used to support the mechanical switches S1 and S2, but with an additional control via software controlled (S3) switches that are part of the output control ports in the microprocessor. The software allows the manufacturer of the device 30 to make any of the switches subject to the other.

A method of operating a multi-use lighting device is also disclosed. The method comprises obtaining a lighting apparatus capable of operation in at least an open configuration and a closed configuration, wherein when the apparatus is in an open configuration (i) a first light source, second light source, and electric grid are viewable, (ii) the first light source and second light source are not in contact with ambient air about the apparatus, and (iii) the electric grid is in contact with ambient air about the apparatus. When the apparatus is in a closed configuration, the first light source and electrical grid are concealed within a cavity in the lighting apparatus. The method further comprises configuring the lighting apparatus for operating in an open configuration by slidably removing the first light source and electric grid from a cavity within the lighting apparatus. It also comprises configuring the lighting apparatus for operating in a closed configuration by slidably disposing the first light source and electric grid within the cavity in the lighting apparatus.

The method further comprising modulating the first beam of light propagated from the first light source ranging from about 315 nm to about 400 nm at a rate greater than about 80 MHz to about 100 MHz or greater than about 100 MHz to about 120 MHz. It also comprises simultaneously modulating a second beam of light propagated from the first light source ranging from about 400 nm to about 720 nm (or alternatively 380 nm to 750 nm) at a rate greater than about 80 MHz to about 100 MHz or greater than about 100 MHz to about 120 MHz at a duty cycle that is greater than the duty cycle of first beam of light. In one aspect, the method comprises simultaneously propagating beam of light from the first light source ranging from about 400 nm to about 720 nm (or alternatively 380 nm to 750 nm) that is not pulse width modulated and/or operating simultaneously operating the second light source.

In another aspect of the technology, the method comprising modulating the first beam of light propagated from the first light source ranging from about 315 nm to about 400 nm at a rate greater than about 1 KHz to about 20 KHz or greater than about 20 KHz to about 100 KHz. It also comprises simultaneously modulating a second beam of light propagated from the first light source ranging from about 400 nm to about 720 nm at a rate greater than about 1 KHz to about 20 KHz or greater than about 20 KHz to about 100 KHz at a duty cycle that is greater than the duty cycle of first beam of light.

It is noted that no specific order is required in any disclosed methods of use unless required by the claims set forth herein, though generally in some embodiments, the method steps can be carried out sequentially.

Stationary Housing

With reference generally to FIGS. 10-16, in another aspect of the technology, a lighting apparatus and insect extermination device 100 is disclosed comprising, generally speaking, light source 110 with an insect attracting UV array, a vacuum (i.e., suction) fan 111 or other air pump and an electrical grid 112. As insects are attracted to the UV array, the vacuum fan (or air pump) 111 creates a negative pressure proximate to the aperture 107 ranging from about 0.1 inches to 0.9 inches (Wg) effectively sucking the insects into an interior of the device 100 and in contact with the electrical grid 112 and/or through the blades of the fan 111 exterminating the insect. The term fan and air pump are used herein to indicate a device that is capable of propagating a volume of air through the housing 101.

In this aspect of the technology, the housing 101 of device 100 is not moveably engaged with a lower housing. Rather, the internal components are all disposed within a single housing. A handle 95 is disposed about a top portion of the housing 101. The housing 101 comprises an upper section 105 and a lower section 106 separated by an aperture 107 that extends partially about an outer perimeter of the housing 101. The light source 110 is disposed within the upper section 105 and comprises one or more LEDs. In one aspect, one LED comprises a white light LED configured to propagate light ranging in the visible spectrum of light (i.e., about 400 nm to about 720 nm) and a UV LED that is configured to propagate light ranging from about 315 nm to about 400 nm at a rate greater than about 1 KHz to about 20 KHz or greater than about 20 KHz to about 100 KHz. The LEDs are covered by a lens 109 to diffuse the light. Light emanating from the LEDs 110 is propagated outward from the device through aperture 107.

Figure 12:
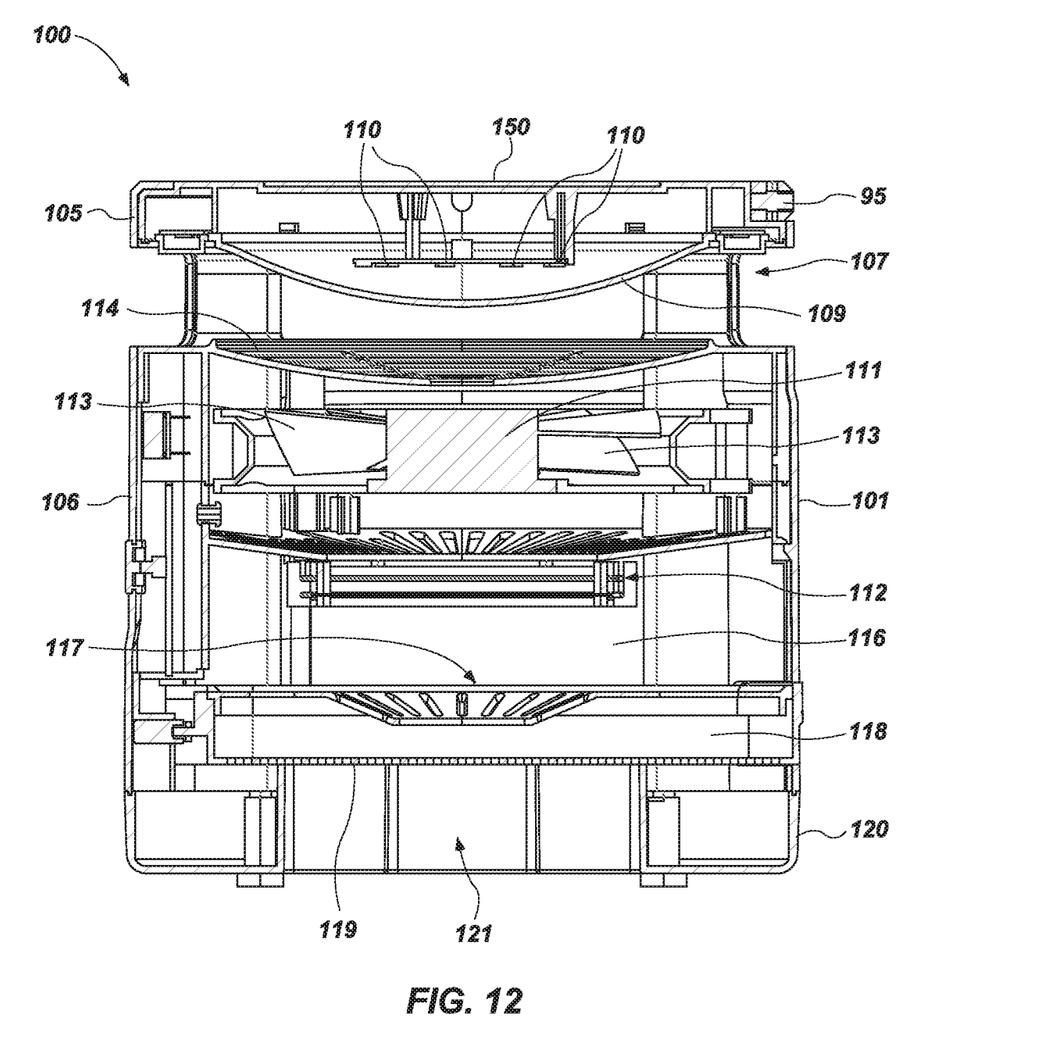
FIG. 12 is a cross-sectional side view of a lighting/insect extermination device in accordance with one aspect of the technology.
Figure 13:
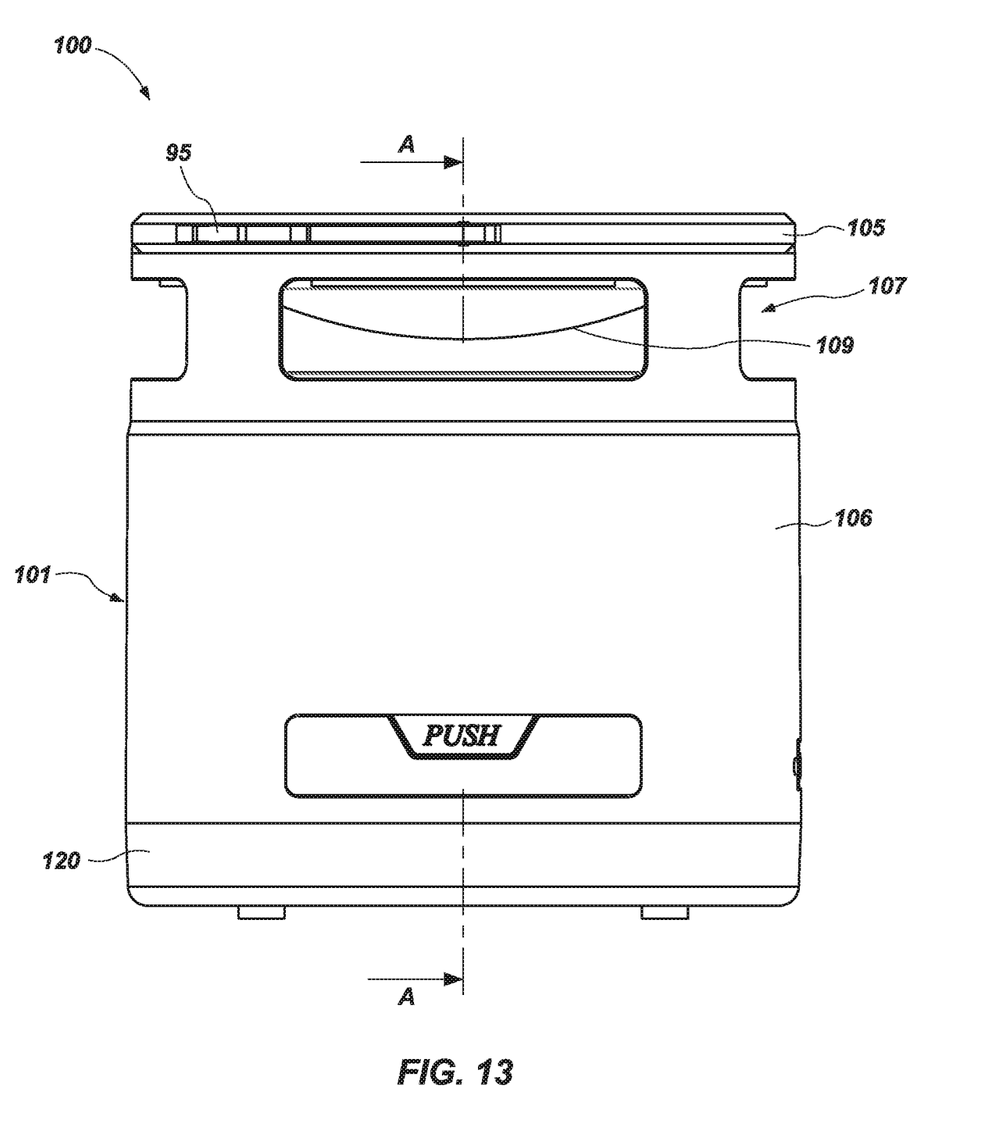
FIG. 13 is a side view of a lighting/insect extermination device in accordance with one aspect of the technology.
Figure 14:
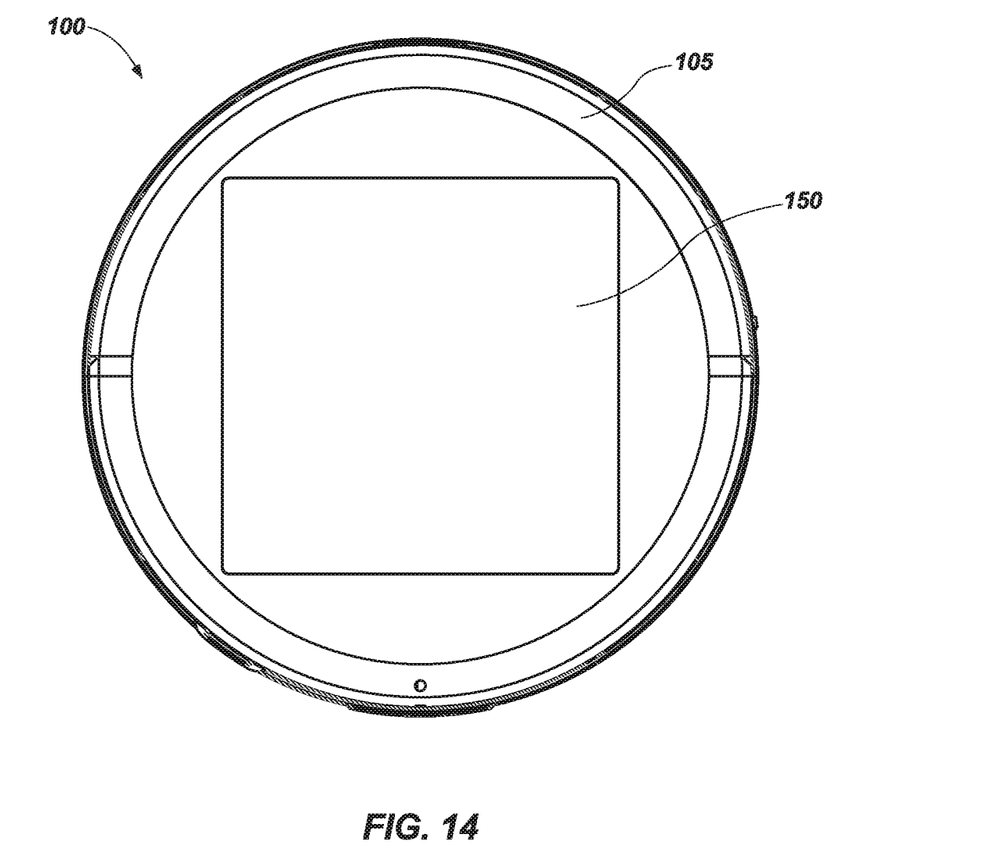
FIG. 14 is a top view of a lighting/insect extermination device in accordance with one aspect of the technology.
Figure 16:
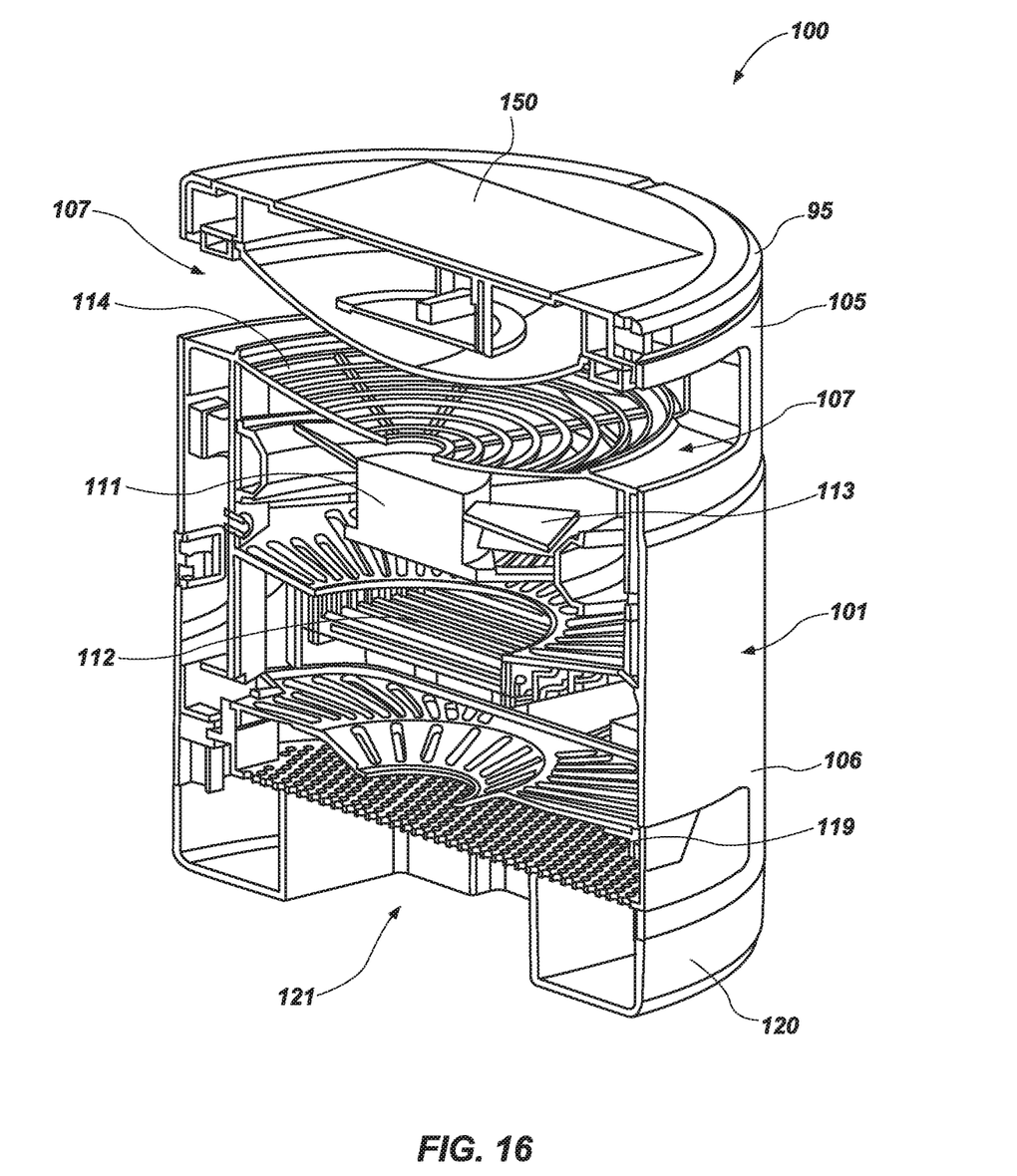
FIG. 16 is a cross-sectional perspective view of a lighting/insect extermination device in accordance with one aspect of the technology.

The lower section 106 of the housing 101 of device 100 comprises a cavity that contains the fan 111 and electrical grid therein. As insects approach aperture 107, the negative pressure that is created from fan 111 "sucks" the insects into aperture 107 and through a grating 114. Insects are then directed through the fan 111 and "pushed" out an opposing side of the fan 111 through the electrical grid 112. The positive pressure propagates insects (exterminated or otherwise) past the electrical grid 112 into a first chamber 116. Insects in the first chamber 116 are pushed through an aperture 117 (or adjacent grating) and into a second chamber 118. The second chamber 118 comprises a screen, filter or grating 119 separating the second chamber 118 from an aperture 120 in the bottom of the housing. The screen, filter or grating 119 permits air to travel through the filter 119 and out the aperture 120 but prevents larger particles of insect parts from exiting through the aperture 120.

Generally speaking, the pathway of air traveling through the device 100 enters through aperture 107 and out the bottom of the device 100 through aperture 120. The insects likewise enter through aperture 107 and follow the same pathway but are exterminated by contact with the fan 111 and/or the electrical grid 112. In one aspect, the air flow through the device ranges from 40 cfm to 80 cfm, though other air flow rates may be used as suits a particular application. In one aspect, a bottom portion 121 of the housing 101 is removable from the remaining portion of the housing. The bottom portion 121 opens up the chamber 118 so that insects (exterminated or otherwise) can be emptied from the device 100. While aspects described herein disclose a fan or air pump 111 located before the electrical grid 112 within the air pathway, it is understood that the fan 111 may be placed after the electrical grid 112. Moreover, the aperture 120 located at the bottom 121 of the housing 100 may also be located on a lateral side of the housing 100 so long as a pathway for the movement of air is created that induces movement of insects in through the aperture 107 and into the "extermination zone" of the device 100.

While a single fan 111 is specifically called out, in one aspect of the technology, the fan or air pump 111 comprises a plurality of stacked dual suction fans that are rotating in opposite directions. That is, one of the fans is rotating in a counter clock-wise direction while the other is rotating in a clock-wise direction. In this manner, the likelihood of insect extermination is increased as the insects are being drawing into the device and through the dual fans. The fan blades 113 may be serrated, sharped, or otherwise enhanced to increase the likelihood that the insects coming in contact with the blades 113 will be exterminated.

Figure 10:
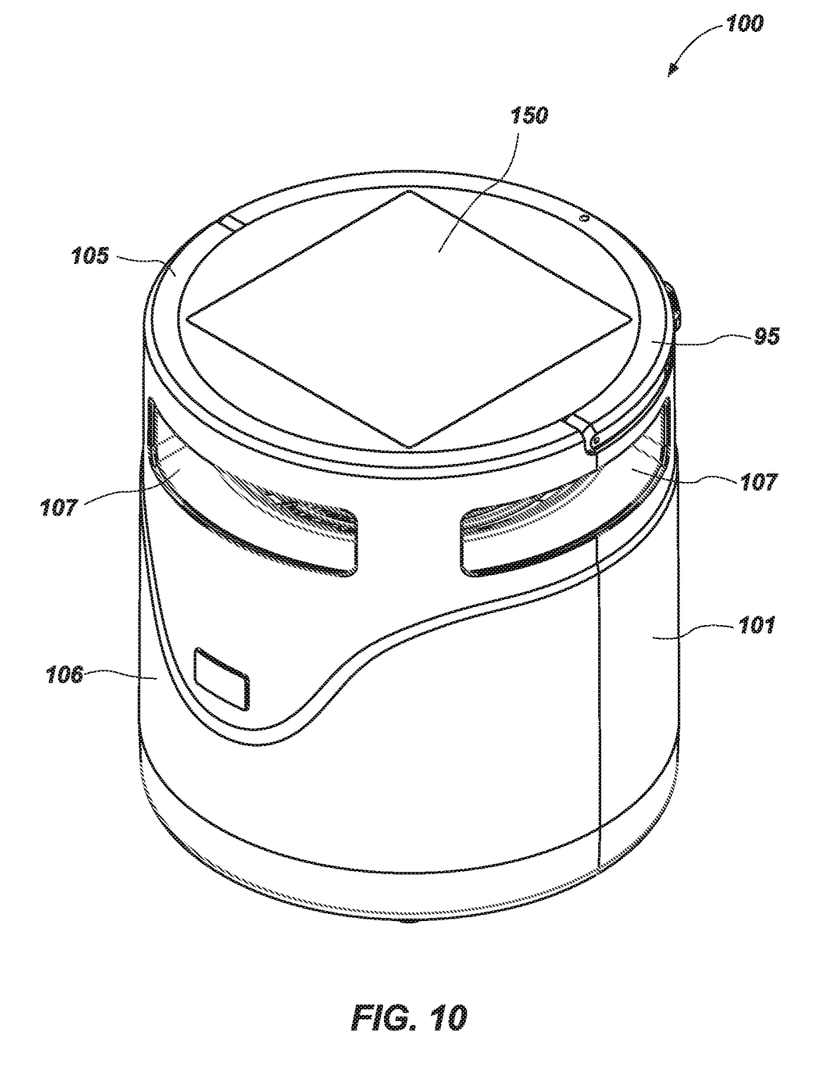
FIG. 10 is a top perspective view of a lighting/insect extermination device in accordance with one aspect of the technology.
Figure 11:
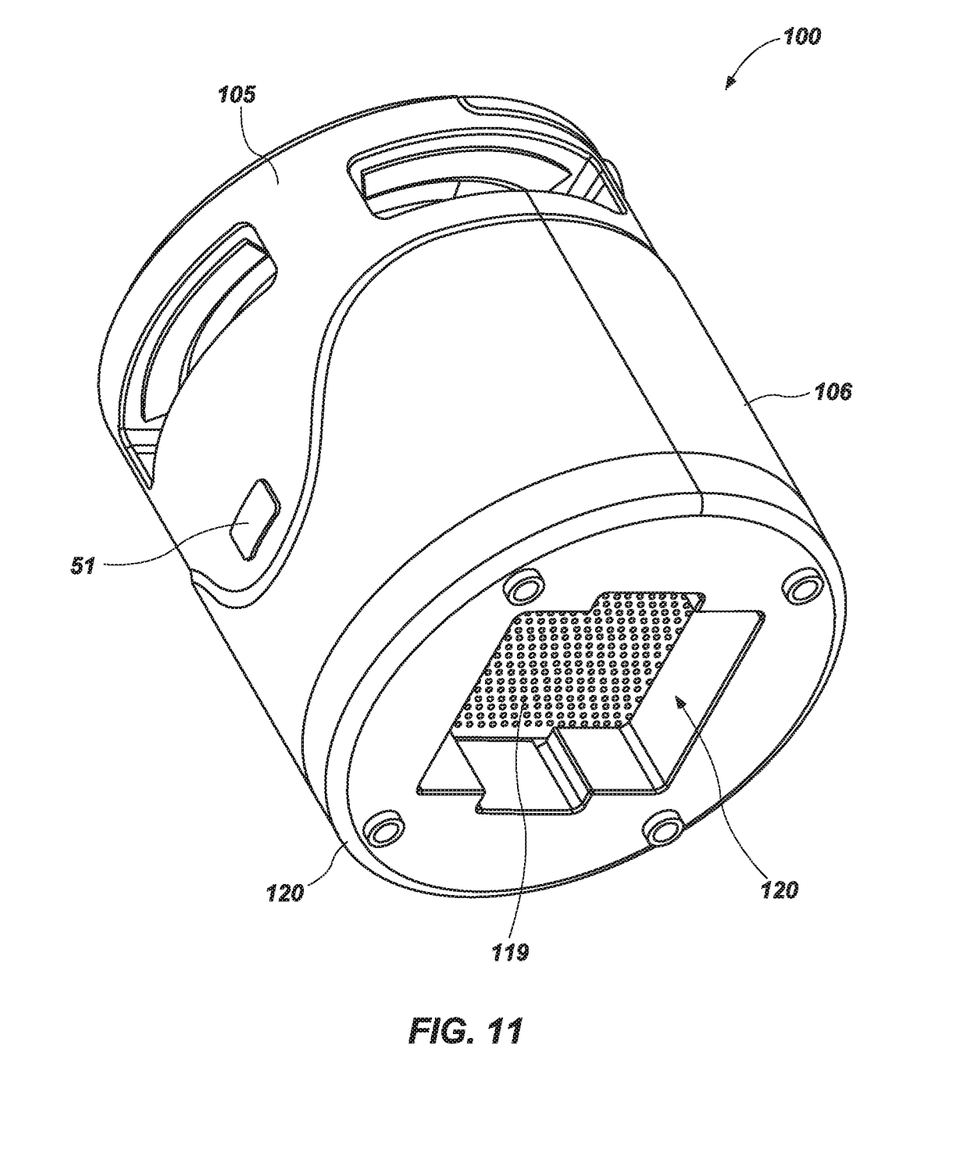
FIG. 11 is a bottom perspective view of a lighting/insect extermination device in accordance with one aspect of the technology.
Figure 15:
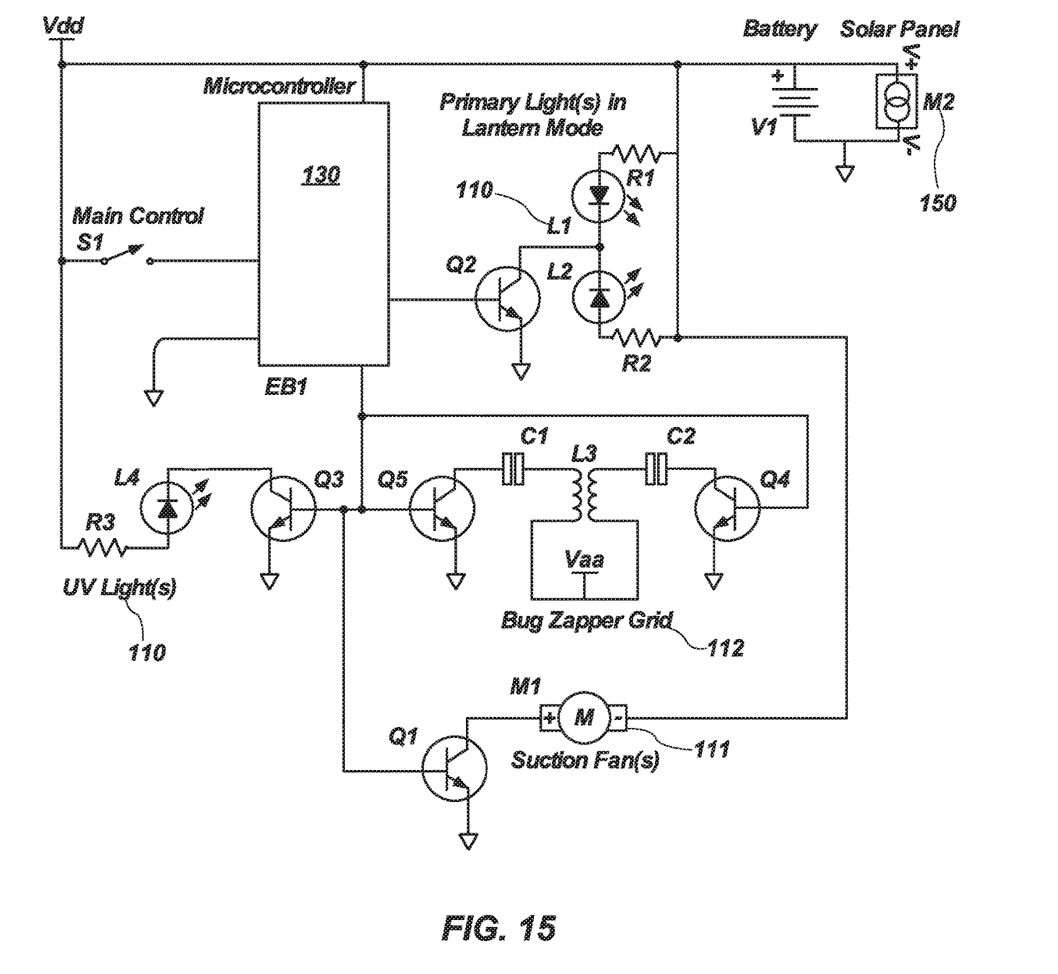
FIG. 15 is an electrical schematic in accordance with one aspect of the technology.

In one aspect, the device 100 can be powered/charged continuously from a wall adapter supply used to convert household voltage levels. However, in one aspect of the technology, a top of the device 100 comprises a solar panel 150 coupled to a re-chargeable power source (e.g., rechargeable batteries, etc.) and/or coupled to a microprocessor 130 or other control mechanism. The microprocessor 130 comprises a circuit for operating the different configurations of the device 100 and can comprise a discrete integrated circuit, logic gates, mechanical switches, or any combination of these to achieve the desired functionality. FIG. 15 shows one manner in which a microprocessor may be configured for operation of the device 100. In this aspect, the microcontroller or microprocessor 130 is coupled to a battery V1 and solar panel M2. A main switch S1 is coupled to the microprocessor 130. The microprocessor 130 is programmed to operate different components of the device 100 depending on different operations of the main switch S1. In one mode, for example, the lantern or white light sources L1 and L2 are operable along with the UV lights L4. Likewise, the electrical grid L3 and fan M1 are shown coupled to the power source V1 and/or M2. In one aspect of the technology, the "on-board" power source (i.e., the batteries) can be configured as a power bank that can be used to charge a separate external device, such as a mobile phone.

In one aspect of the technology, a cavity within the housing 101 includes a replaceable attractant, such as octanol. In one aspect of the technology, the attractant is placed near a heat source within the housing to enhance the dispersement of the attractant. For example, in one aspect of the technology, an octanol pod or capsule is located near the fane or air pump 111. Heat generated from the motor of the fan or heat pump 111 increases the volatilization rate of the octanol. As the attractant is volatilized the air pump disperses the attractant to the surrounding area. The attractant may also be placed near the light source (e.g., the LEDs) as they also produce an amount of heat.

In accordance with one aspect of the technology, the microprocessor is programmed to measure the electrical output (e.g., voltage) from the solar panel 150 and compare the values to a predetermined set of values corresponding to a position of the sun during its daily cycle. A current date can be entered on the device 100 to further refine the accuracy of this function. In accordance with one aspect of the technology, when a comparison of electrical output values indicates that the sun is retreating from the daily apex, the microprocessor 130 is configured to activate into the UV/Fan/Grid mode ("Auto Mode") and run for a predetermined period of time. Dusk is typically the most active time period for mosquitos, for example. At civil dusk, the center of the sun's disc goes 6° below the horizon in the evening. It marks the end of civil twilight, which begins at sunset. At this time objects are still distinguishable and depending on weather conditions some stars and planets may start to become visible to the naked eye. The sky has many colors at this time, such as orange and red. Beyond this point artificial light may be needed to carry out outdoor activities, depending on atmospheric conditions and location. At nautical dusk, the sun apparently moves to 12° below the horizon in the evening. It marks the end of nautical twilight, which begins at civil dusk. At this time, objects are less distinguishable, and stars and planets appear to brighten. At astronomical dusk, the sun's position is 18° below the horizon in the evening. It marks the end of astronomical twilight, which begins at nautical dusk. After this time the sun no longer illuminates the sky, and thus no longer interferes with astronomical observations. In one aspect of the technology, the microprocessor 130 is configured to activate for a period of 2 to 3 hours when it is determined that civil dusk has begun. In one aspect of the technology, the microprocessor 130 utilizes a 22 to 24 hour timer to frame or filter the solar panel output information to help compensate for periods of cloudiness that could lead to a false trigger of the Auto Mode. In another aspect, the device 100 is programmed to activate Auto Mode at dawn since that is another period of the day that mosquitos, for example, are active. The Auto Mode run time is managed by the internal circuitry of the processor 130 to ensure that the battery is not depleted beyond a typical recoverable base charge; about 2.5 volts. This helps manage the battery depletion on days when the solar panel recharge cycle is not sufficient to complete a full battery replenishment.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A portable combination lighting apparatus and insect extermination device, comprising:
   a housing comprising an upper section and a lower section;
   a light source disposed in the upper section;
   an electrical grid and negative pressure source disposed in the lower section;
   a power source coupled to the light source and the electric grid;
   a second aperture disposed in the lower section, wherein the negative pressure source causes air to be propagated inward through a first aperture, through the electrical grid, and out the second aperture;
   wherein the light source comprises a plurality of LEDs mounted in the upper section, wherein a first portion of the LEDs is configured to propagate light ranging from about 400 nm to 720 nm and a second portion of the LEDs is configured to propagate light ranging from about 315 nm to 400 nm.

2. The lighting apparatus of claim 1, wherein the negative pressure source is also a source of positive pressure.

3. The lighting apparatus of claim 2, wherein the negative pressure source comprises a fan having a serrated edge.

4. The lighting apparatus of claim 1, wherein the electrical grid extends across an internal perimeter of the housing.

5. The lighting apparatus of claim 1, further comprising a programmable logic controller coupled to a switch and the power source, the controller configured to operate the first light source such that light propagated from one or more LEDs ranging from about 315 nm to about 400 nm is pulse width modulated at a rate greater than about 20 KHz while light propagated from one or more LEDs ranging from about 400 nm to about 720 nm is not pulse width modulated or is pulse width modulated at a rate below 2 KHz.

6. The lighting apparatus of claim 5, further comprising a solar panel coupled to a programmable logic control system and the power source.

7. The lighting apparatus of claim 6, wherein the programmable logic control system is configured to measure an electrical output from the solar panel and compare the electrical output value to a predetermined set of values corresponding to a position of the sun during a cycle of the sun.

8. The lighting apparatus of claim 6, wherein the programmable logic control system is configured to activate the device for a period of 2 to 3 hours after the device is activated when an output value from the solar panel approximates a value corresponding to civil dusk.

9. The lighting apparatus of claim 5, wherein the programmable logic control system is configured to activate the device when an output value from the solar panel approximates a value corresponding to civil dusk.

10. A method of using a portable lighting/insect extermination device, comprising:
   activating a power switch disposed on the lighting/insect extermination device, said device comprising a housing having an upper section and a lower section, an aperture disposed between the upper section and the lower section, a light source disposed in the upper section, an electrical grid disposed in the lower section, a fan disposed in the lower section configured to generate a negative pressure on a first side of the fan and a positive pressure on a second side of the fan, and a power source coupled to the light source, the fan, and the electric grid;
   propagating light from the light source, wherein the light source comprises a first LED and a second LED;
   generating a negative pressure adjacent the first aperture and a positive pressure adjacent a second aperture within the device; and
   drawing insects into the first aperture and in contact with the electrical grid
   modulating a first beam of light propagated from the first LED ranging from about 315 nm to about 400 nm at a rate greater than about 2 KHz to about 20 KHz.

11. The method of claim 10, further comprising simultaneously modulating a second beam of light propagated from the second LED ranging from about 400 nm to about 720 nm at a rate greater than about 2 KHz to about 20 KHz at a duty cycle that is greater than the duty cycle of first beam of light.

12. The method of claim 10, further comprising simultaneously propagating beam of light from the second LED ranging from about 400 nm to about 720 nm that is not pulse width modulated or is pulse width modulated at a rate below 2 KHz.

13. The method of claim 10, further comprising simultaneously operating the first and second LED.

14. A portable combination lighting apparatus and insect extermination device, comprising:
   a housing comprising an upper section and a lower section;
   a light source disposed in the upper section comprising one or more LEDs;
   an electrical grid and negative pressure source disposed in the lower section, wherein the negative pressure source causes air to be propagated through the electrical grid;
   a power source coupled to the light source and the electric grid; and
   a programmable logic controller coupled to a switch and the power source, the controller configured to operate the light source such that light propagated from the light source ranging from about 315 nm to about 400 nm is pulse width modulated at a rate greater than about 20 KHz while light propagated from the light source ranging from about 400 nm to about 720 nm is not pulse width modulated or is pulse width modulated at a rate below 2 KHz.

* * * * *